(12) United States Patent
Duan et al.

(10) Patent No.: US 8,326,262 B2
(45) Date of Patent: Dec. 4, 2012

(54) ADVICE OF CHARGING METHOD, SYSTEM AND MOBILE TERMINAL

(75) Inventors: Haifeng Duan, Shenzhen (CN); Yimin Li, Shenzhen (CN); Dagang Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 502 days.

(21) Appl. No.: 12/545,941

(22) Filed: Aug. 24, 2009

(65) Prior Publication Data

US 2009/0311989 A1    Dec. 17, 2009

Related U.S. Application Data

(63) Continuation of application No. PCT/CN2008/073821, filed on Dec. 29, 2008.

(30) Foreign Application Priority Data

Dec. 27, 2007  (CN) .......................... 2007 1 0160588
May 21, 2008  (CN) .......................... 2008 1 0108616

(51) Int. Cl.
*H04M 11/00* (2006.01)

(52) U.S. Cl. ........ 455/406; 455/405; 455/407; 455/408; 705/34

(58) Field of Classification Search .................. 455/406
See application file for complete search history.

(56) References Cited

U.S. PATENT DOCUMENTS

| | | | |
|---|---|---|---|
| 6,195,543 B1 * | 2/2001 | Granberg ...................... 455/407 |
| 6,473,622 B1 * | 10/2002 | Meuronen ..................... 455/466 |
| 6,865,262 B1 * | 3/2005 | Mitts et al. ............... 379/114.02 |
| 2002/0077076 A1 * | 6/2002 | Suryanarayana et al. .... 455/406 |
| 2004/0087299 A1 * | 5/2004 | Vallinen et al. ................ 455/405 |
| 2004/0125755 A1 * | 7/2004 | Roberts ......................... 370/259 |
| 2006/0212511 A1 * | 9/2006 | Garcia-Martin .............. 709/203 |
| 2007/0004388 A1 * | 1/2007 | Veikkolainen ............. 455/414.1 |
| 2007/0053330 A1 * | 3/2007 | Stafford et al. ............... 370/338 |
| 2008/0063161 A1 * | 3/2008 | Joyce et al. ................ 379/114.2 |
| 2009/0132401 A1 * | 5/2009 | Batz et al. ....................... 705/34 |
| 2010/0017521 A1 * | 1/2010 | Ying et al. .................... 709/227 |

FOREIGN PATENT DOCUMENTS

CN   1113562 C   7/2003

(Continued)

OTHER PUBLICATIONS

1st Office Action in corresponding Russian Application No. 2009127793 (Oct. 27, 2010).

(Continued)

*Primary Examiner* — Charles Appiah
*Assistant Examiner* — Mazda Sabouri
(74) *Attorney, Agent, or Firm* — Leydig, Voit & Mayer, Ltd.

(57) ABSTRACT

An advice of charging (AoC) method, system, and mobile terminal thereof are provided. The method includes receiving AoC information sent by a service charging server, and then displaying the AoC information. The mobile terminal includes a receiving module adapted to receive AoC information sent by a service charging server, and a display module adapted to display the received AoC information. The system includes a terminal, a service charging server, a service gateway, and a charging engine. The present invention is applicable to pre-consumption prompt, post-consumption notification, and prompts for data services such as browsing, streaming media, and mail.

13 Claims, 5 Drawing Sheets

FOREIGN PATENT DOCUMENTS

| | | |
|---|---|---|
| CN | 1867018 A | 11/2006 |
| CN | 101047745 A | 10/2007 |
| EP | 1 657 903 A1 | 5/2006 |
| WO | WO 98/59504 A1 | 12/1998 |

OTHER PUBLICATIONS

Written Opinion of the International Searching Authority in corresponding PCT Application No. PCT/CN2008/073821 (Apr. 9, 2009).

1st Office Action in corresponding Chinese Application No. 200810108616.5 (Dec. 9, 2010).

"Digital Cellular Telecommunications System (Phase 2+); Universal Mobile Telecommunications System (UMTS); Telecommunication Management; Charging Management; Charging Architecture and Principles (3GPP TS 32.240 Version 7.2.0 Release 7)," *ETSI Standards*, ETSI TS 132 240, 3SA5(V7.2.0): 1-44 (Mar. 2007).

European Office Action (Mar. 22, 2010).

\* cited by examiner

ADVICE OF CHARGING METHOD, SYSTEM AND MOBILE TERMINAL

CROSS-REFERENCE TO RELATED APPLICATIONS

This application is a continuation of International Patent Application No. PCT/CN2008/073821, filed Dec. 29, 2008, which claims priority to Chinese Patent Application No. 200710160588.7, filed Dec. 27, 2007, and Chinese Patent Application No. 200810108616.5, filed May 21, 2008, all of which are hereby incorporated by reference in their entirety.

FIELD OF TECHNOLOGY

The embodiment of the present invention relates to the field of communication technology, and more particularly to an advice of charging (AoC) method, an AoC system, and a mobile terminal.

BACKGROUND

Advice of charging (AoC) functions to prompt to a user by a server the account status and balance information when the user logs on for the first time, or when the user accesses a service that needs to be charged, inform the user about the cost of the service access in advance or prompt the user with the cost of the service afterwards.

In the conventional art, an AoC method includes the following steps. A terminal initiates a service browsing request to a service gateway. The service gateway identifies the service type and terminal ID, modifies a uniform resource location (URL) of the service browsing request into a URL of a service charging server, and sends the URL to the service charging server. The service charging server requests corresponding charge information of a charging engine, then generates a prompt page according to the returned charge information, and returns the prompt page to the service gateway. The service gateway forwards the prompt page to the terminal. The terminal receives the prompt page, accepts this charge according to a user operation, for example, pressing an OK key, and meanwhile sends a service request to the service gateway. The service gateway receives the service request, identifies that this service browsing request has already been sent to the service charging server, and then forwards the service request to a service provider (SP)/content provider (CP). The SP/CP returns response information of the service request to the service gateway, and the service gateway forwards the response information to the terminal.

The above method is mainly adapted to modify the URL of the service browsing request of the terminal on the service gateway side into the URL of the service charging server, and then display the URL to the user by a browser. As for non-Hypertext Transfer Protocol (HTTP)/Wireless Application Protocol (WAP) browsing data services, the browser is not activated in the use of the services, so the above method cannot be used. Therefore, this method is inapplicable to data services such as streaming media and mail. Further, this method is only applicable to fee advice before using the services, and cannot be employed to inform the actual cost after the service is used.

SUMMARY

Accordingly, the present invention is directed to an advice of charging (AoC) method, system, and mobile terminal thereof, which are applicable to on-line AoC for all types of data services, and employ unified interface to receive messages, thereby facilitating the service deployment.

An AoC method is provided in an embodiment of the present invention. The method includes: receiving AoC information sent by a service charging server, and displaying the AoC information.

A mobile terminal including a receiving module and a display module is provided in an embodiment of the present invention.

The receiving module is adapted to receive AoC information sent by a service charging server.

The display module is adapted to display the AoC information.

An AoC system including a service charging server and a mobile terminal is provided in an embodiment of the present invention.

The service charging server is adapted to send AoC information for a mobile terminal to display the AoC information.

A computer readable medium is provided in an embodiment of the present invention. The computer readable medium includes code for receiving AoC information sent by a service charging server and displaying the AoC information.

The AoC method, system, and mobile terminal thereof provided by the embodiments of the present invention are applicable to on-line AoC for all types of data services, and employ unified interface to receive the AoC information, thereby facilitating the service deployment.

DETAILED DESCRIPTION

Technical solutions provided in the embodiments of the present invention are illustrated in detail below with the accompanying drawings.

Figure 1:
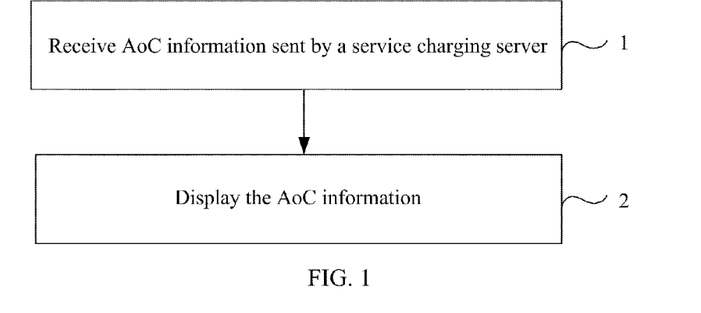
FIG. 1 is a flow chart of an AoC method according to a first embodiment of the present invention.

FIG. 1 is a flow chart of an AoC method according to a first embodiment of the present invention. The method includes the following steps.

Step 1: AoC information sent by a service charging server is received, and the entity that receives the AoC information may be a service charging agent located in a terminal.

Step 2: The service charging agent displays the AoC information to the terminal.

In this embodiment, the AoC information sent by the service charging server is received and displayed, so that the method is applicable to on-line AoC for all types of data services, and employs unified interface to receive the AoC information, thereby facilitating the service deployment.

Figure 2:
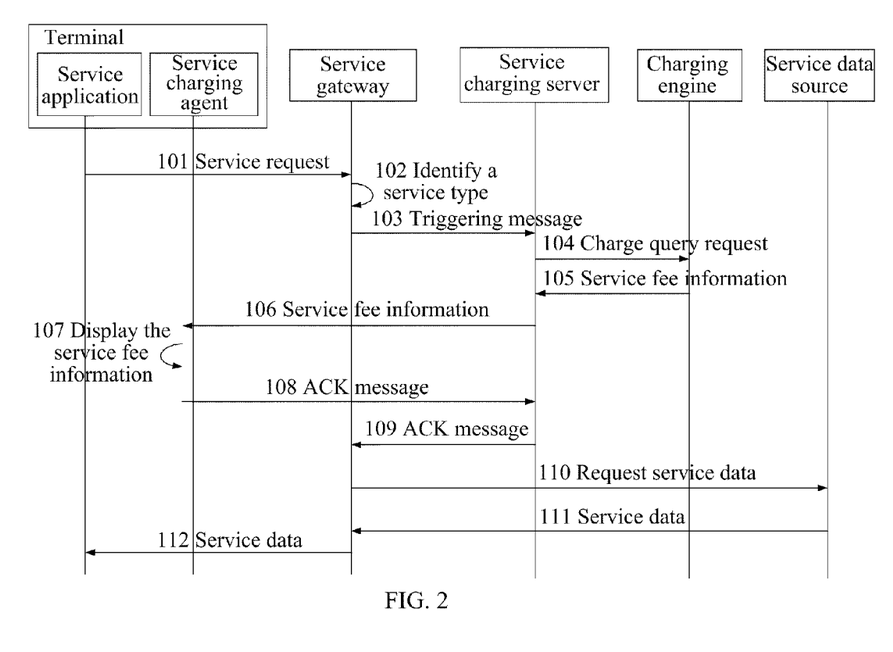
FIG. 2 is a signaling flow chart of an AoC method according to a second embodiment of the present invention.

FIG. 2 is a signaling flow chart of an AoC method according to a second embodiment of the present invention. In this embodiment, first, a user terminal initiates to a service gateway a service request, such as WAP/WEB page browsing, mail sending or receiving, and streaming media playback. The protocol adopted by the service request and the parameter thereof are related to the specific service. For example, HTTP/WAP protocol is employed for browsing services, and the parameter thereof includes URL address information. Real-Time Streaming Protocol (RTSP) is employed for streaming media services, and the parameter thereof includes streaming media server address.

In particular, the method of this embodiment includes the following steps.

Step 101: The service gateway receives the service request initiated by the terminal.

Step 102: The service gateway identifies the service type.

The service gateway may identify the service type via a simple quintuple mechanism, i.e., via protocol type, Internet Protocol (IP) source address and port, and IP destination address and port; or identify the service type by using a deep packet inspection (DPI) technique. For example, determining a forwarded mailbox server address by identifying the recipient address in a Simple Mail Transfer Protocol (SMTP).

Step 103: The service gateway sends a charge prompt triggering message to the service charging server.

A network generally includes more than one service charging server, and thus the service gateway may choose a specific service charging server according to the terminal information or the service information. Further, the protocol adopted by the triggering message includes, but not limited to, the HTTP protocol, and the triggering message may be a user ID, service ID, terminal capability information, service status, access network type, user location, charging engine location, or any combination thereof.

Step 104: The service charging server receives the triggering message, and sends a charge query request to the charging engine.

The protocol adopted by the charge query request includes, but not limited to, the HTTP protocol, and the charge query request may be a user ID, service ID, access network type, user location, or any combination thereof. The address of the charging engine may be statically configured in the service charging server or acquired from the service gateway.

Step 105: The charging engine queries the service fee information according to the charge query request, and returns the service fee information to the service charging server. The querying, by the charging engine, the service fee information is triggered by the service gateway to the charging engine through the service charging server according to the service request.

Step 106: The service charging server receives the service fee information, and forwards the service fee information to the service charging agent on the terminal.

The communication between the service charging server and the service charging agent may adopt various bearer modes, such as short messaging service (SMS), HTTP, or WAP.

Step 107: The service charging agent displays the service fee information at the terminal.

Step 108: After viewing the service fee information, if the user intends to continue using the service, the service charging agent sends an ACK message indicating the use of the service to the service charging server.

Step 109: The service charging server forwards the ACK message indicating the use of the service to the service gateway.

Step 110: The service gateway requests service data of a service data source.

Step 111: The service gateway acquires the service data from the service data source.

Step 112: The service gateway sends a service response including the service data to the terminal.

This embodiment is applicable to on-line AoC for all types of data services, and employs unified interface to receive the AoC information, thereby facilitating the service deployment. This embodiment is further adapted to provide pre-consumption prompts for services, which is not only applicable to browsing data services based on HTTP/WAP, but also to data services such as streaming media and mail.

Figure 3:
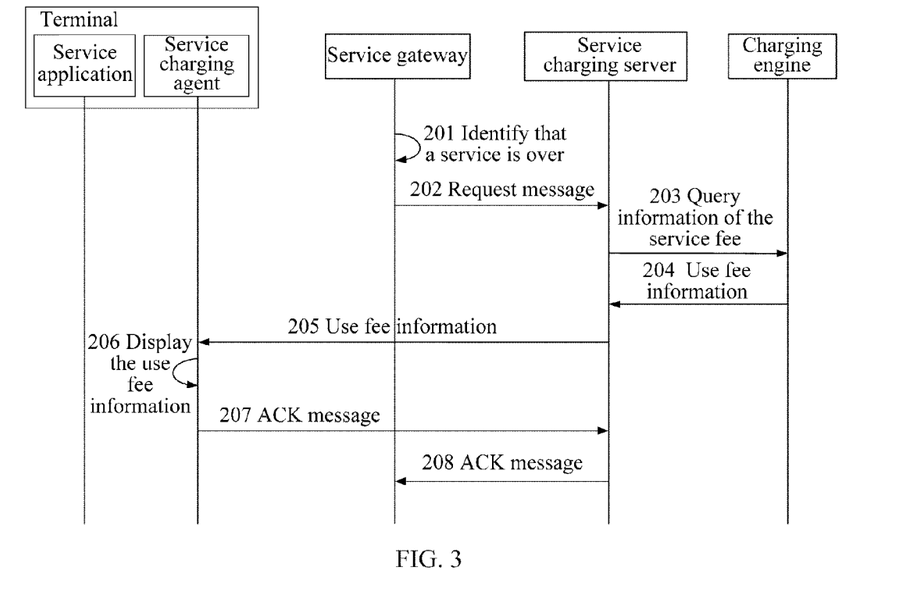
FIG. 3 is a signaling flow chart of an AoC method according to a third embodiment of the present invention.

FIG. 3 is a signaling flow chart of an AoC method according to a third embodiment of the present invention. In this embodiment, the service prompt information is about a use fee. Referring to FIG. 3, the method specifically includes the following steps.

Step 201: The service gateway identifies that the use of a service is over.

Step 202: The service gateway initiates a charging notification request message to the service charging server.

The request message at least includes a service charging ID. The service charging ID is acquired by an associated charging component of the service gateway when sending the charge information to the charging engine.

Step 203: The service charging server sends query information of the service fee to the charging engine according to the service charging ID in the charging notification request message.

Step 204: The charging engine queries the use fee information, and sends the use fee information to the service charging server.

Step 205: The service charging server receives the use fee information, and forwards the use fee information to the service charging agent on the terminal.

The communication between the service charging server and the service charging agent may adopt various bearer modes, such as SMS, HTTP, or WAP.

Step 206: The service charging agent displays the use fee information at the terminal.

After Step 206, this embodiment further includes the following steps.

Step 207: The service charging agent returns a charging notification ACK message to the service charging server.

Step 208: The service charging server forwards the charging notification ACK message to the service gateway.

This embodiment is applicable to on-line AoC for all types of data services, and employs unified interface to receive the AoC information, thereby facilitating the service deployment. This embodiment is specifically adapted to provide post-consumption prompts for services, which is not only applicable to browsing data services based on HTTP/WAP, but also to data services such as streaming media and mail.

Figure 4:
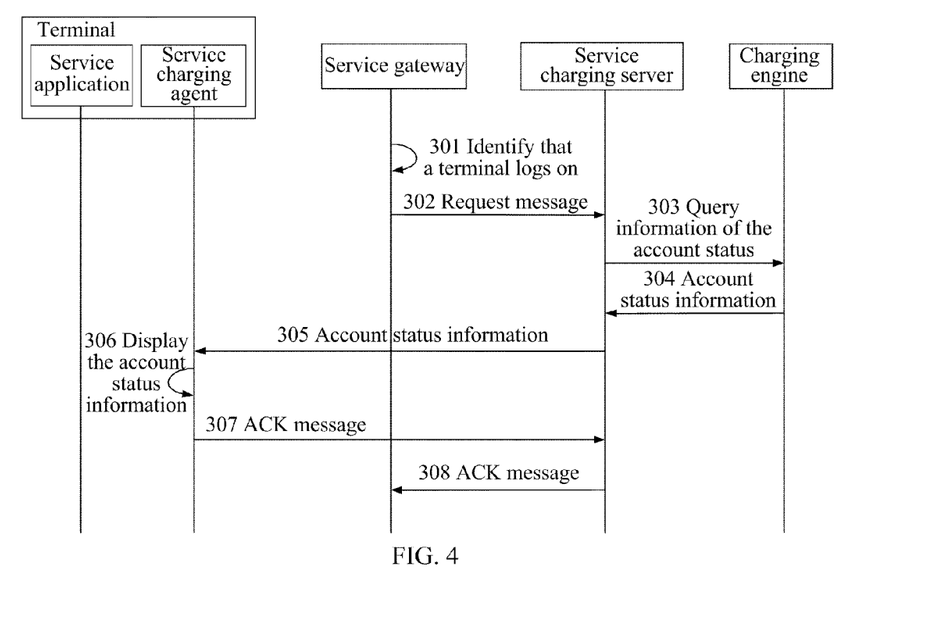
FIG. 4 is a signaling flow chart of an AoC method according to a fourth embodiment of the present invention.

FIG. 4 is a signaling flow chart of an AoC method according to a fourth embodiment of the present invention. In this embodiment, the service prompt information is about an account status. Referring to FIG. 4, the method specifically includes the following steps.

Step 301: The service gateway identifies that the terminal logs on.

Step 302: The service gateway initiates an account status request message to the service charging server.

The request message at least includes a user ID, such as a mobile station integrated services digital number (MSISDN) or any other information.

Step 303: The service charging server sends query information of the account status to the charging engine according to the user ID in the account status request message.

Step 304: The charging engine queries the account status information, and sends the account status information to the service charging server.

Step 305: The service charging server receives the account status information, and forwards the account status information to the service charging agent on the terminal.

The communication between the service charging server and the service charging agent may adopt various bearer modes, such as SMS, HTTP, or WAP.

Step 306: The service charging agent displays the account status information at the terminal.

After Step 306, this embodiment further includes the following steps.

Step 307: The service charging agent returns an ACK message of notifying the account status to the service charging server.

Step 308: The service charging server forwards the ACK message to the service gateway.

This embodiment is applicable to on-line AoC for all types of data services, and employs unified interface to receive the AoC information, thereby facilitating the service deployment. This embodiment is specifically adapted to provide account status notifications for services, which is not only applicable to browsing data services based on HTTP/WAP, but also to data services such as streaming media and mail.

Figure 5:
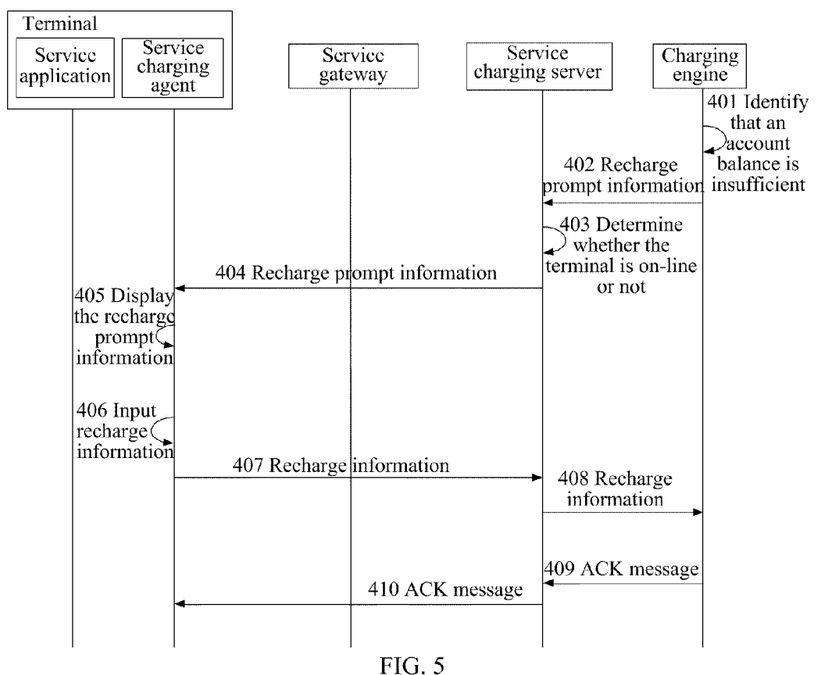
FIG. 5 is a signaling flow chart of an AoC method according to a fifth embodiment of the present invention.

FIG. 5 is a signaling flow chart of an AoC method according to a fifth embodiment of the present invention. In this embodiment, the service prompt information is about a recharge prompt. Referring to FIG. 5, the method specifically includes the following steps.

Step 401: The charging engine identifies that an account balance is insufficient, and initiates recharge prompt information to the service charging server.

The recharge prompt information at least includes a user ID, such as an MSISDN or any other information.

Step 402: The service charging server receives the recharge prompt information.

Step 403: The service charging server determines whether the terminal is on-line, and if yes, performs Step 404. Otherwise, the service returns information indicating that the request fails to the charging engine.

Step 404: The service charging server forwards the recharge prompt information to the service charging agent on the terminal.

The communication between the service charging server and the service charging agent may adopt various bearer modes, such as SMS, HTTP, or WAP.

Step 405: Service charging agent displays the recharge prompt information at the terminal.

Step 406: The user receives the recharge prompt information, and inputs recharge information according to the recharge prompt information.

Step 407: The service charging agent sends the recharge information to the service charging server.

Step 408: The service charging server forwards the recharge information to the charging engine.

Step 409: The charging engine completes the recharging procedure according to the recharge information, and returns a recharge successful ACK message to the service charging server. The recharge successful ACK message may include the account balance information.

Step 410: The service charging server forwards the recharge successful ACK message to the service charging agent on the terminal.

This embodiment is applicable to on-line AoC for all types of data services, and employs unified interface to receive the AoC information, thereby facilitating the service deployment. This embodiment is specifically adapted to provide recharge prompts, which is not only applicable to browsing data services based on HTTP/WAP, but also to data services such as streaming media and mail.

Through the description of the above embodiments, the provided AoC method has the following advantages.

1. The user is enabled to learn about in time the cost of a service to be used or the cost of a service already generated, or to acquire the account status at any time, and meanwhile, acquire the recharge prompt information in time when the account balance is insufficient.

2. The AoC method is applicable to all types of data services, and not only applicable to browsing data services based on HTTP/WAP, but also to data services such as streaming media and mail.

3. The AoC method receives the service prompt information through the service charging agent, and employs unified interface to receive messages, thereby facilitating the service deployment.

4. The AoC method adopts a centralized message management mechanism, thus simplifying a service processing logic of a network element (NE) and interactive messages between the NEs.

5. The AoC method displays the service prompt information at the terminal through the service charging agent, thus achieving a unified user display interface and enhancing the user service experience.

Figure 6:
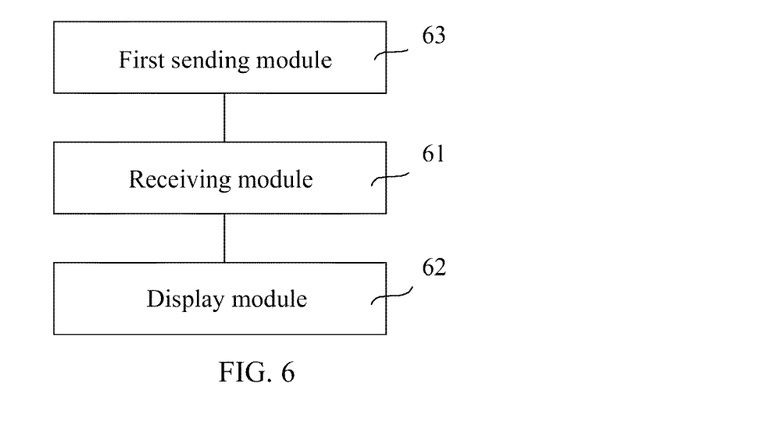
FIG. 6 is a schematic view of a mobile terminal according to an embodiment of the present invention.

FIG. 6 is a schematic view of a mobile terminal according to an embodiment of the present invention. Referring to FIG. 6, the mobile terminal of this embodiment includes a receiving module 61 adapted to receive AoC information sent by a service charging server, and a display module 62 adapted to display the AoC information.

The mobile terminal further includes a first sending module 63 adapted to send a service request to a service gateway. The receiving module 61 is specifically adapted to receive service fee information queried by a charging engine and forwarded by the service charging server, and the querying by the charging engine the service fee information is triggered by the service gateway to the charging engine through the service charging server according to the service request. The display module 62 is specifically adapted to display the service fee information.

The first sending module 63 is further adapted to send an ACK message indicating the use of the service to the service charging server. The receiving module 61 is further adapted to receive a service response sent by the service gateway, and the service response is sent by the service gateway based on service data acquired from a service data source according to the ACK message indicating the use of the service forwarded by the service charging server.

In this embodiment, the receiving module 61 is specifically adapted to receive use fee information acquired by the service charging server in the manner of sending query information of the service cost to the charging engine according to a charging notification request message sent by the service gateway, and the display module 62 is specifically adapted to display the use fee information.

In this embodiment, the receiving module 61 is specifically adapted to receive account status information acquired by the service charging server in the manner of sending query information of the account status to the charging engine according to an account status request message sent by the service gateway, and the display module 62 is specifically adapted to display the account status information.

In this embodiment, the receiving module 61 is specifically adapted to receive recharge prompt information sent by the service charging server when the service charging server determines that the terminal is on-line, in which the recharge prompt information is received by the service charging server sent from the charging engine when the charging engine identifies that the account balance is insufficient, and the display module 62 is specifically adapted to display the recharge prompt information. The receiving module 61 is further adapted to receive recharge information input by a user according to the recharge prompt information. Thus, the mobile terminal further includes a second sending module adapted to send the recharge information to the service charging server. The receiving module 61 is specifically adapted to receive a recharge successful ACK message forwarded by the service charging server, and the recharge successful ACK message is a message returned by the charging engine after completing the recharging procedure according to the recharge information forwarded by the service charging server.

This embodiment is applicable to on-line AoC for all types of data services, and employs unified interface to receive the AoC information, thereby facilitating the service deployment. This embodiment is specifically adapted to provide AoC and notifications, account status notifications, and recharge prompts, which are thus applicable to all types of data services. The receiving module 61 receives the AoC information, and employs unified interface to receive AoC messages, thereby facilitating the service deployment. A centralized message management mechanism is adopted, and a service processing logic of an NE and interactive messages between the NEs are thus simplified. The display module 62 further displays the service prompt information at the terminal, so that a unified user display interface is achieved and the user service experience is enhanced.

Figure 7:
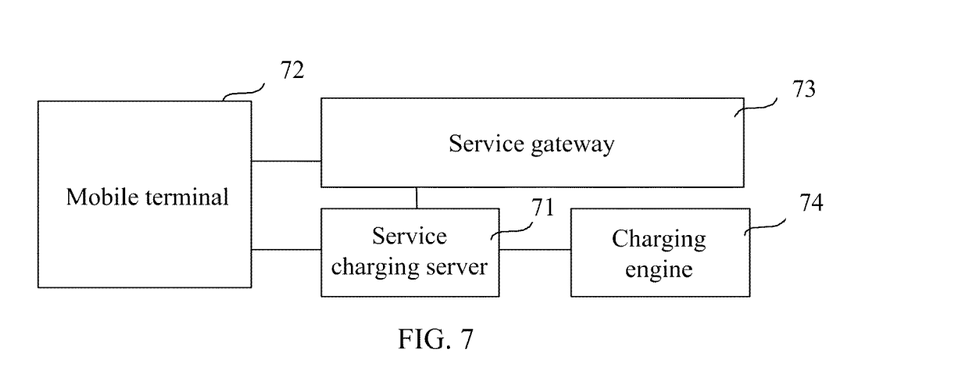
FIG. 7 is a schematic view of an AoC system according to an embodiment of the present invention.

FIG. 7 is a schematic view of an AoC system according to an embodiment of the present invention. Referring to FIG. 7, the system of this embodiment includes a service charging server 71 adapted to send AoC information, and a mobile terminal 72 adapted to receive the AoC information sent by the service charging server 71 and display the AoC information.

The mobile terminal 72 is further adapted to send a service request. The system of this embodiment further includes a service gateway 73 adapted to receive and identify the service request, and send a charge prompt triggering message to the service charging server 71 according to the service request; a charging engine 74 adapted to receive a charge query request sent by the service charging server 71; and send service fee information to the service charging server 71 according to the charge query request. Accordingly, the service charging server 71 is further adapted to receive the charge prompt triggering message sent by the service gateway 73, and send the charge query request to the charging engine 74 according to the charge prompt triggering message.

In this embodiment, the mobile terminal 72 is further adapted to send an ACK message indicating the use of the service. The service charging server 71 is further adapted to forward the ACK message indicating the use of the service sent by the mobile terminal 72. The service gateway 73 is further adapted to send a service response to the mobile terminal 72 based on service data acquired from a service data source according to the ACK message indicating the use of the service forwarded by the service charging server 71.

An AoC system provided in another embodiment of the present invention specifically includes a service charging server adapted to send AoC information; a mobile terminal adapted to receive the AoC information sent by the service charging server and display the AoC information; a service gateway adapted to send a charging notification request message to the service charging server; and a charging engine adapted to receive query information of the service cost sent by the service charging server, and send use fee information to the service charging server according to the query information of the service fee. Accordingly, the service charging server is further adapted to receive the charging notification request message sent by the service gateway, and send the query information of the service fee to the charging engine according to the charging notification request message.

An AoC system provided in still another embodiment of the present invention specifically includes a service charging server adapted to send AoC information; a mobile terminal adapted to receive the AoC information sent by the service charging server, and display the AoC information; a service gateway adapted to send an account status request message to the service charging server; and a charging engine adapted to receive the query information of the account status sent by the service charging server, and send account status information to the service charging server according to the query information of the account status. Accordingly, the service charging server is further adapted to receive the account status request message sent by the service gateway, and send the query information of the account status to the charging engine according to the account status request message.

An AoC system provided in yet another embodiment of the present invention specifically includes a service charging server adapted to send AoC information; a mobile terminal adapted to receive the AoC information sent by the service charging server and display the AoC information; and a charging engine adapted to identify an account balance, and send recharge prompt information to the service charging server when the charging engine identifies that the account balance is insufficient. The service charging server is further adapted to receive the recharge prompt information sent by the charging engine, determine whether the mobile terminal is on-line or not, and send the recharge prompt information to the mobile terminal when determining that the mobile terminal is on-line. Moreover, in this embodiment, the mobile terminal is further adapted to receive recharge information input by a user according to the recharge prompt information, and send the recharge information to the service charging server. The service charging server is further adapted to forward the recharge information to the charging engine, and forward a recharge successful ACK message sent by the charging engine to the mobile terminal. The charging engine is further adapted to receive the recharge information, complete the recharging procedure according to the recharge information, and return the recharge successful ACK message to the service charging server.

The above embodiments are applicable to on-line AoC for all types of data services, and employ unified interface to receive the AoC information, thereby facilitating the service deployment. In particular, the AoC system provided by the above embodiments is adapted to provide AoC and notifications, account status notifications, and recharge prompts, which are thus applicable to all types of data services. The mobile terminal is adapted to receive the AoC information, and employ unified interface to receive messages, thereby facilitating the service deployment. A centralized message management mechanism is adopted, and a service processing logic of an NE and interactive messages between the NEs are thus simplified. The mobile terminal further displays the service prompt information at the terminal through the service charging agent, so that a unified user display interface is achieved and the user service experience is enhanced.

Those of ordinary skill in the art should understand that all or a part of the steps of the method according to the embodiments of the present invention may be implemented through hardware related to program instructions. The program may be stored in a computer readable storage medium. When the program is run, the steps of the method according to the embodiments of the present invention are performed. The storage medium may be any medium that is capable of storing program codes, such as a ROM, a RAM, a magnetic disk, or an optical disk.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. An advice of charging (AoC) method, comprising:
   sending, by a mobile terminal, a service request to a service gateway, wherein a service type is identified by the service gateway according to the service request;
   receiving, by a service charging agent in the mobile terminal, AoC information sent by a service charging server through an unified interface, wherein the service charging server is selected by the service gateway according to terminal information or service information; and
   displaying, by the service charging agent, the AoC information to the mobile terminal; wherein
   the receiving, by the service charging agent in the mobile terminal, the AoC information sent by the service charging server specifically comprises: receiving service fee information queried by a charging engine and forwarded by the service charging server; and the querying, by the charging engine, the service fee information is triggered by the service gateway to the charging engine through the service charging server according to the service request;
   the displaying, by the service charging agent, the AoC information to the mobile terminal specifically comprises: displaying, by the service charging agent, the service fee information to the mobile terminal;
   sending, by the mobile terminal, an acknowledgement message indicating use of a service to the service charging server; and
   receiving, by the mobile terminal a service response sent by the service gateway, wherein the service response is sent based on service data acquired from a service data source according to the acknowledgement message indicating the use of the service forwarded by the service charging server.

2. The method according to claim 1, further comprising:
   receiving recharge information input by a user according to recharge prompt information;
   sending the recharge information to the service charging server; and
   receiving a recharge successful acknowledgement message forwarded by the service charging server, wherein the recharge successful acknowledgement message is a message returned by the charging engine after completing recharging procedure according to the recharge information forwarded by the service charging server.

3. A mobile terminal, comprising:
   a first sending module, adapted to send a service request to a service gateway, wherein a service type is identified by the service gateway according to the service request;
   a receiving module, adapted to receive advice of charging (AoC) information sent by a service charging server through an unified interface, wherein the service charging server is selected by the service gateway according to terminal information or service information; and
   a display module, adapted to display the AoC information; wherein
   the receiving module is further adapted to receive service fee information queried by a charging engine and forwarded by the service charging server and the querying by the charging engine the service fee information is triggered by the service gateway to the charging engine through the service charging server according to the service request;
   the display module is further adapted to display the service fee information;
   the first sending module is further adapted to send an acknowledgement message indicating use of service to the service charging server; and
   the receiving module is further adapted to receive a service response sent by the service gateway, wherein the service response is sent by the service gateway based on service data acquired from a service data source according to the acknowledgement message indicating the use of the service forwarded by the service charging server.

4. The mobile terminal according to claim 3, wherein
   the receiving module is further adapted to receive use fee information acquired by the service charging server by sending query information about a service fee to the charging engine according to a charging notification request message sent by a service gateway; and
   the display module is further adapted to display the use fee information.

5. The mobile terminal according to claim 3, wherein
   the receiving module is further adapted to receive account status information acquired by the service charging server by sending query information of account status to a charging engine according to an account status request message sent by the service gateway; and
   the display module is further adapted to display the account status information.

6. The mobile terminal according to claim 3, wherein
   the receiving module is further adapted to receive recharge prompt information sent by the service charging server when determining that a terminal is on-line, and the recharge prompt information is received by the service charging server and is sent by a charging engine when the charging engine identifies that the account balance is insufficient; and
   the display module is further adapted to display the recharge prompt information.

7. The mobile terminal according to claim 6, further comprising:
   a second sending module, adapted to send the recharge information to the service charging server; wherein
   the receiving module is further adapted to receive recharge information input by a user according to the recharge prompt information; and
   the receiving module is further adapted to receive a recharge successful acknowledgement message forwarded by the service charging server, and the recharge successful acknowledgement message is a message returned by the charging engine after completing recharging procedure according to the recharge information forwarded by the service charging server.

8. An advice of charging (AoC) system, comprising:

a service gateway, adapted to receive a service request from a mobile terminal and identify a service type according to the service request;

a service charging server, adapted to send AoC information for a service charging agent in the mobile terminal through an unified interface to display the AoC information, wherein the service charging server is selected by the service gateway according to terminal information or service information; wherein the service gateway is further adapted to send a charge prompt triggering message to the service charging server according to the service request;

a charging engine, adapted to receive a charge query request sent by the service charging server and send service fee information to the service charging server according to the charge query request;

accordingly, the service charging server is further adapted to receive the charge prompt triggering message sent by the service gateway and send the charge query request to the charging engine according to the charge prompt triggering message; and adapted to forward the acknowledgement message indicating the use of service sent by the mobile terminal; and the service gateway is further adapted to send a service response to the mobile terminal based on service data acquired from a service data source according to the acknowledgement message indicating the use of the service forwarded by the service charging server.

9. The system according to claim 8, wherein the service gateway is further adapted to send a charging notification request message to the service charging server; and the AoC system further comprises:

a charging engine, adapted to receive query information of service fee sent by the service charging server and send use fee information to the service charging server according to the query information of the service fee;

wherein, accordingly, the service charging server is further adapted to receive the charging notification request message sent by the service gateway and send the query information of the service fee to the charging engine according to the charging notification request message.

10. The system according to claim 8, wherein the service gateway is further adapted to send an account status request message to the service charging server; and the AoC system further comprises:

a charging engine, adapted to receive query information of account status sent by the service charging server and send account status information to the service charging server according to the query information of the account status;

wherein, accordingly, the service charging server is further adapted to receive the account status request message sent by the service gateway and send the query information of the account status to the charging engine according to the account status request message.

11. The system according to claim 8, further comprising:

a charging engine adapted to identify an account balance and send recharge prompt information to the service charging server when the charging engine identifies that the account balance is insufficient;

wherein the service charging server is further adapted to receive the recharge prompt information sent by the charging engine, determine whether the mobile terminal is on-line or not, and send the recharge prompt information to the mobile terminal when determining that the mobile terminal is on-line.

12. The system according to claim 11, wherein the mobile terminal is further adapted to receive recharge information input by a user according to the recharge prompt information, and send the recharge information to the service charging server;

the service charging server is further adapted to forward the recharge information to the charging engine, and forward a recharge successful acknowledgement message sent by the charging engine to the mobile terminal; and the charging engine is further adapted to receive the recharge information, complete recharging procedure according to the recharge information, and return the recharge successful acknowledgement message to the service charging server.

13. A computer readable non-transitory storage medium, comprising software instructions for performing a method according to claim 1.

* * * * *